United States Patent [19]

Dick

[11] Patent Number: 5,738,604
[45] Date of Patent: Apr. 14, 1998

[54] FOUR-WHEEL MOTOR VEHICLE DRIVE TRANSFER CASE WITH LIMITED DIFFERENTIATION

[75] Inventor: Wesley M. Dick, Ft. Wayne, Ind.

[73] Assignee: Dana Corporation, Toledo, Ohio

[21] Appl. No.: 690,642

[22] Filed: Jul. 30, 1996

[51] Int. Cl.⁶ .......................... F16H 48/02; F16H 48/24
[52] U.S. Cl. .......................................... 475/206; 180/249
[58] Field of Search .......................... 475/206, 222, 475/249; 180/249

[56] References Cited

U.S. PATENT DOCUMENTS

| | | | |
|---|---|---|---|
| 2,959,237 | 11/1960 | Hill | 180/249 |
| 3,941,199 | 3/1976 | Williams | 180/249 |
| 3,993,152 | 11/1976 | Fogelburg | 180/249 |
| 4,124,085 | 11/1978 | Fogelburg | 180/249 |
| 4,595,087 | 6/1986 | Morisawa et al. | 192/67 R |
| 4,714,129 | 12/1987 | Mueller | 180/248 |
| 4,977,989 | 12/1990 | Ashikawa et al. | 192/56 R |
| 5,038,884 | 8/1991 | Hamada et al. | 180/233 |
| 5,226,860 | 7/1993 | Baxter, Jr. et al. | 475/206 |
| 5,409,429 | 4/1995 | Showalter et al. | 475/295 |

*Primary Examiner*—Dirk Wright
*Attorney, Agent, or Firm*—Oldham & Oldham Co., LPA

[57] ABSTRACT

A four-wheel motor vehicle drive transfer case with limited differentiation is designed to provide full time four-wheel drive and limit slip or differentiation between the rear and front wheels of a motor vehicle using a mechanical system. The torque transfer case allows differentiation between the front and the rear wheels of the motor vehicle up to a predetermined threshold and thereafter prevents differentiation so that the torque to the axle with the slipping wheels is redirected and transmitted to the axle with the non-slipping wheels. Preferably, an interaxle differential in the torque transfer case locks whenever the rear output shaft attempts to overrun the front output shaft. Also, the torque transfer case preferably allows the front drive shaft to overrun the rear drive shaft by that amount that occurs during "normal" motor vehicle turning and cornering operations or that amount which may occur due to differences in tire static loaded radius and thereafter locks the interaxle differential to prevent any further differentiation.

27 Claims, 3 Drawing Sheets

FOUR-WHEEL MOTOR VEHICLE DRIVE TRANSFER CASE WITH LIMITED DIFFERENTIATION

BACKGROUND AND SUMMARY OF THE INVENTION

The present invention relates generally to new and novel improvements in transfer cases for use in four-wheel drive motor vehicles. More particularly, the present invention relates to transfer cases for use in four-wheel drive motor vehicles which include mechanical arrangements for limiting slip or differentiation between the front wheels and the rear wheels of motor vehicles. Transfer cases in accordance with the present invention allow slip or differentiation between the front wheels and the rear wheels of motor vehicles up to a predetermined threshold and, thereafter, preclude such slip or differentiation so that torque being provided to the axle with slipping wheels is redirected and transmitted to the axle with non-slipping wheels.

Four-wheel drive motor vehicles are becoming increasingly popular. Recently, certain motor vehicles have been provided with "full-time" four-wheel drive systems. In such "full-time" four-wheel drive systems, the torque transfer cases are typically provided with an interaxle differential for dividing torque between the front wheels and the rear wheels of the motor vehicle. The interaxle differential enables the front wheels and the rear wheels to rotate at different speeds, which occurs during normal turning of the motor vehicle or in the event that the front wheels and the rear wheels have tires with different diameters. However, to prevent excessive slipping between the front and the rear wheels, as might occur when one set of wheels encounters a low-traction condition, such as ice, these transfer cases typically includes a selectively engageable clutch which is operative to lock the interaxle differential upon sensing a predetermined amount of slippage between the front output shaft and the rear output shaft of the transfer case. Locking of the interaxle differential prevents any relative slip or differentiation between the front output shaft and the rear output shaft of the transfer case.

Known prior "full-time" four-wheel drive systems have generally required complex electronic sensors or other complex systems to monitor the slip or differentiation between the front output shark and the rear output shaft or the front wheels and the rear wheels of a motor vehicle. Upon sensing slip or differentiation, an electronic control system determines whether the slip or differentiation being encountered is within a "normal" expected range or is "excessive." If the electronic control system indicates that the slip or differentiation being experienced is "excessive," the electronic control system causes the selectively engageable clutch to lock the interaxle differential to preclude any further slip or differentiation. An electronic control system or this type can be expensive to manufacture and maintain and a more cost-effective, simplified system of limiting slip or differentiation between the front output shaft and the rear output shaft of a four-wheel drive torque transfer case in a motor vehicle would be desirable.

A preferred embodiment of the present invention is, therefore, directed to a four-wheel drive system for a motor vehicle having an engine and transmission assembly and including a torque transfer case for dividing torque between the front axle and the rear axle of the motor vehicle. The torque transfer case preferably includes an input shaft coupled to the transmission assembly such that the input shaft is rotatably driven by the transmission assembly, a first output shaft to transmit torque to the front axle of the motor vehicle, a second output shaft to transmit torque to the rear axle of the motor vehicle, an interaxle differential, a first one-way clutch to selectively lock the differential when the second output shaft overruns the first output shaft by a predetermined amount, and a second one-way clutch to selectively lock the differential when the first output shaft overruns the second output shaft by a predetermined amount.

Accordingly, the present invention provides a simple, all-mechanical arrangement for sensing when locking of the interaxle differential is required to provide the required amount of torque to both the first output shaft and the second output shaft of the torque transfer case.

Other advantages and novel features of the present invention will become apparent in the following detailed description of the invention when considered in conjunction with the accompanying drawings.

DETAILED DESCRIPTION OF THE INVENTION

Figure 1:
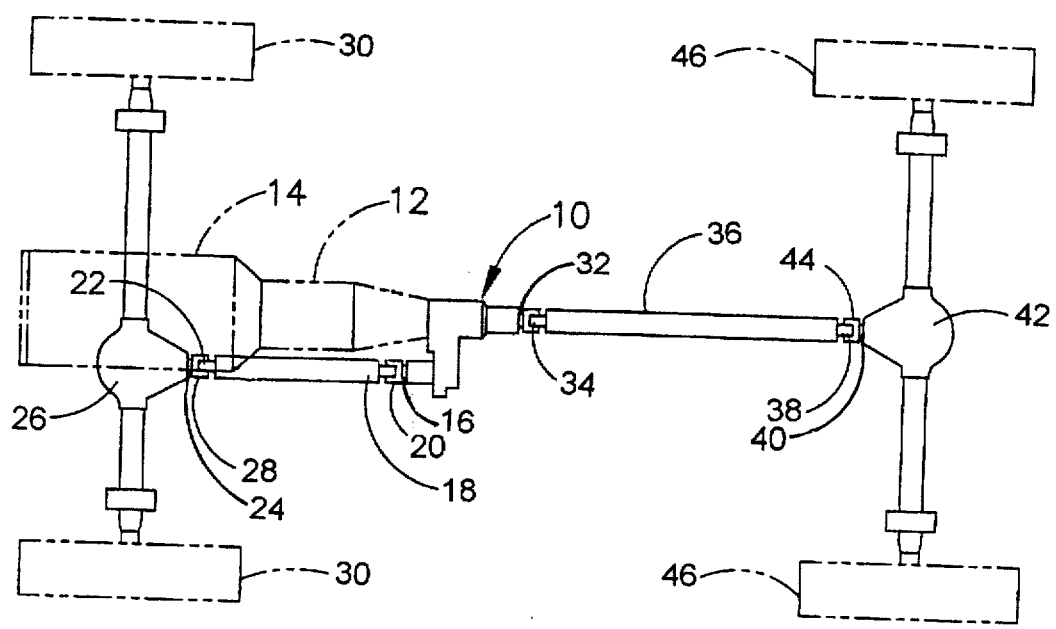
FIG. 1 illustrates a top plan schematic view of a motor vehicle having a four-wheel drive system with a torque transfer case in accordance with a preferred embodiment of the present invention.

In the following detailed description of preferred embodiments of the present invention, reference is made to the accompanying drawings which, in conjunction with this detailed description, illustrate and describe a first and a second preferred embodiment of a four-wheel drive motor vehicle drive transfer case with limited differentiation in accordance with the present invention. Referring now to the drawings, in which like-referenced characters indicate corresponding elements throughout the several views, attention is first directed to FIG. 1, which illustrates a top plan schematic view of a motor vehicle having a four-wheel drive system with a torque transfer case with limited differentiation in accordance with preferred embodiments of the present invention. Torque transfer case 10 is coupled with motor vehicle transmission 12 of conventional design which, in turn, is coupled to motor vehicle drive engine 14. Torque transfer case 10 generally includes a first or front torque output shaft 16, which is connected to the rearward end of motor vehicle front axle drive shaft 18 via universal joint coupling 20 of conventional design. Forward end 22 of motor vehicle front axle drive shaft 18 is coupled to input shaft or yoke 24 of motor vehicle front differential unit 26 via universal joint coupling 28 of conventional design. Motor vehicle front differential unit 26 is adapted to divide torque from motor vehicle front axle drive shaft 18 to front wheels 30 of the motor vehicle. Torque transfer case 10 also includes second or rear torque output shaft 32 which is drivingly connected to forward end 34 of motor vehicle rear axle drive shaft 36 of conventional design. Motor vehicle rear axle drive shaft 36 has rearward end 38 connected to input shaft or yoke 40 of motor vehicle rear differential unit 42 via universal joint coupling 44 of conventional design. Motor vehicle rear differential unit 42 is adapted to divide torque received from motor vehicle rear axle drive shaft 36 between rear wheels 46 of the motor vehicle.

Figure 2:
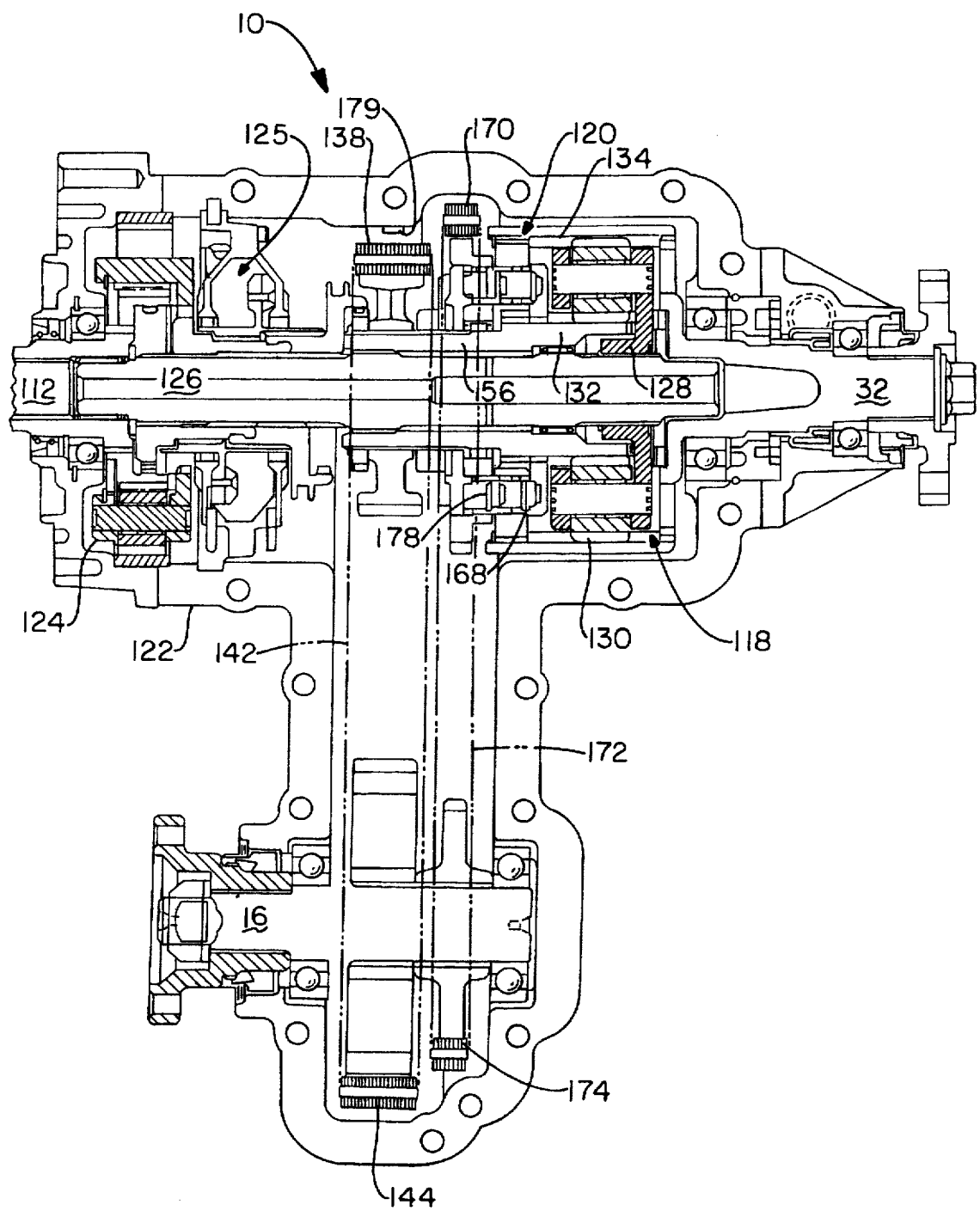
FIG. 2 shows a cross sectional view of a transfer case including a first embodiment of the system to limit differentiation in the transfer case in accordance with a first embodiment of the present invention.

Turning now to FIG. 2, a first preferred embodiment of the invention is shown in torque transfer case 10. The torque transfer case 10 generally includes an input shaft 112 which receives torque from the engine 14 and transmission assembly 12 of a vehicle as shown in FIG. 1. The rear output shaft 32 and front output shaft 16 are connected to the rear and front drive shafts of the vehicle to provide drive power thereto as described with reference to FIG. 1. An inter-axle planetary gear differential generally indicated at 118 may be used to divide torque from input shaft 112 between the rear output shaft 32 and front output shaft 16. The inter-axle differential 118 can be of any suitable type, and is shown as a planetary type, although other types may also be used, such as bevel gear types or other conventional types. Associated with the inter-axle differential 118, the system for limiting differential speed between rotating members in the transfer case 10 is generally shown at 120. In this invention, the system 120 does not inhibit differentiation between the output shafts 16 and 32 during normal vehicle operation; such as may occur during cornering where differentiation between shafts 14, 16 is required. Beyond normal differentiation required between the output shafts, the system 20 limits the allowable differential speed between the shafts 16 and 32.

Excessive differential rotation may occur between the output shafts 16, 32 when a front or rear wheel of the vehicle engages a surface having a low coefficient of friction, such as may occur when the wheel encounters mud or ice. The system 120 of the invention has the capacity to arrest relative rotation between the output shafts 16, 32 should relative rotational speed exceed a predetermined or prespecified limit, and also provides a mechanism by which torque may be transferred to a non-slipping axle upon the occurrence of excessive differentiation between the output shafts 16, 32. As is set forth in further detail below, the mechanical system 120 is designed such that when one of the shafts 16 or 32 overruns the other shaft by a predetermined amount, the system 120 will arrest relative rotation between the output shafts 14, 16 should excessive differential rotation between these shafts occur.

The transfer case 10 shown in FIG. 2 is merely an example of a torque transfer case, and the system 120 of the invention may be used with other types of transfer cases. In this example, the input shaft 112 is rotatably supported within housing 122. Although not part of this invention, the input shaft 112 may be coupled through a planetary gear set 124 to an intermediate shaft 126 rotatably supported in housing 122. The planetary gear set 124 may provide low and high speed ranges in operation of transfer case 10. An actuator assembly 125 may be used to shift between speed ranges in the transfer case 10. Alteratively, the transfer case 10 may be a single speed transfer case. The intermediate shaft 126 in this example is coupled to and drives the planet carrier 128 of the interaxle differential 118. Planet carrier 128 carries a plurality of circumferentially spaced and individually rotatable planet gears 130, each of which gears 130 meshingly engages with the sun gear 132 and ring gear 134 of the planetary gear differential 118. Sun gear 132 is rotatably mounted about intermediate shaft 126 and includes a sleeve which carries a main drive sprocket 138 coupled to rotate therewith. Ring gear 134 of the planetary differential 118 is drivingly coupled to a link gear 140, which in turn is drivingly connected to the rear output shaft 32 to provide driving torque thereto. In this example of the transfer case 10, the torque is transmitted from the vehicle engine and transmission to the input shaft 112 and through the planetary gear set 124 to the intermediate shaft 126. The intermediate shaft 126 in turn drives the planet carrier 128 associated with the interaxle differential 118, transmitting torque to the sun gear 132 and ring gear 134 thereof. Driving torque is transmitted from the ring gear 134 to the rear output shaft 32, and through the sun gear 132 to drive sprocket 138. The drive sprocket 138 is connected to a drive chain 142, or the like, to drive a second sprocket 144 coupled to rotate with the front output shaft 16. Those skilled in the art will recognize, however, that the particular configuration and components of transfer case 10 to distribute torque from the input shaft 112 to the output shafts 16 and 32 are merely an example, and a variety of arrangements may be utilized. For example, the interaxle differential 118 may be of any suitable type, such as a bevel gear type or the like. The invention is therefore not to be limited to the particular torque transfer case configuration shown.

In this embodiment, when front wheels 30 and rear wheels 46 of the vehicle are presented with similar traction conditions, for example, when the vehicle is traveling on dry pavement, the interaxle differential 118 serves to divide the torque received from input shaft 112 such that neither output shaft 16 or 32 receives a disproportionate amount of torque. Consequently, both front wheels 30 and rear wheels 46 serve to propel the motor vehicle. However, when front wheels 30 or rear wheels 46 encounter surfaces having significantly different coefficients of friction, the nature of interaxle differential 118 is such that the wheels encountering the surface having the significantly lower coefficient of friction may exceed the tractive capability of that surface and begin to spin. The remaining wheels will then receive torque at the same level as the spinning wheel or wheels, as modified by the ratios in the affected differentials and by the residual friction in the system, which is usually inconsequential. If the coefficient of friction for the surface under the non-slipping wheel or wheels is greater, then additional traction can be obtained by restricting differentiation and thereby directing more torque to the wheels having a greater tractive capability. In this embodiment of transfer case 10, when either first or front torque output shaft 16, rotate significantly faster than second or rear torque output shaft 32, or on the other hand, when second or rear torque output shaft 32 and rear wheels 46 rotate significantly faster than first or front torque output shaft 16, the components are said to be "differentiating" relative to each other. The faster rotating components are said to be "overrunning" the slower rotating components. Prior known systems have used complex and expensive sensors and electro-mechanical means for locking interaxle planetary gear differential 50 at the required times. In contrast to these prior systems, the four-wheel motor vehicle drive transfer case with limited differentiation in accordance with the present invention provides mechanical means for allowing at least as much differentiation as may be required at the maximum steering angle for a particular motor vehicle, and, thereafter, prevents further differentiation. The invention limits the differentiation between the output shafts 16 and 32 to automatically provide more torque to the wheels with the greater tractive capability.

Accordingly, in the transfer case 10, a first overrunning or one-way clutch 168 is provided for drivingly coupling sleeve member 156 of sun gear 132 to second or rear torque output shaft 32, on a selective basis, which effectively locks interaxle differential 118. This allows second or rear torque output shaft 32 to transit torque to sleeve member 156 when second or rear torque output shaft 32 attempts to overrun sleeve member 156. Accordingly, additional torque is transmitted to front wheels 30, which may have better traction with which to provide propelling force for the motor vehicle. The second or rear torque output shaft 32 will attempt to overrun sleeve member 156 when rear wheels 46 slip and begin to spin significantly more rapidly than front wheels 30, as might occur when one or both rear wheels encounter ice, snow, mud or the like. First overrunning or one-way clutch 168 is preferably a bi-directional or double-acting, one-way clutch, as will be described below, to allow sleeve member 156 to overrun second or rear torque output shaft 32, as may occur during "normal" motor vehicle operations, such as during cornering or turning, when front wheels 30 of the motor vehicle spin faster than rear wheels 46. Therefore, first overrunning or one-way clutch 168 may only transmit torque from second or rear torque output shaft 32 to sleeve member 156 and not from sleeve member 156 to second or rear torque output shaft 32.

In "normal" motor vehicle operating conditions, such as cornering or turning with high or relatively high traction, front wheels 30 of the motor vehicle naturally speed up and overrun rear wheels 46. As discussed previously, the amount by which front wheels 30 overrun rear wheels 46 under such "normal" motor vehicle operating conditions has a maximum value which may be determined for particular motor vehicles by turning the motor vehicle steering wheel to either extreme into a position known as the "maximum steering angle." In a full-time four-wheel drive system, such as is being described herein, it is desirable to allow for this maximum level of differentiation in order to avoid "wheel hop", excessive tire wear and other undesirable motor vehicle handling characteristics. However, excessive differentiation or overrunning of front wheels 30 relative to rear wheels 46 beyond this maximum level of differentiation encountered at the maximum steering angle is indicative of a low traction condition being encountered by front wheels 30. It is therefore desirable to provide means for allowing interaxle differential 118 to differentiate up to the maximum expected amount of differentiation which needs to occur at the maximum steering angle for a particular motor vehicle, and to, thereafter, "lock" interaxle differential 118 to prevent any differentiation beyond this maximum expected amount.

In this embodiment, the first drive sprocket assembly comprising sprockets 138 and 144 and chain 142 provides driving torque to output shaft 16. A second drive sprocket assembly is provided in this embodiment to provide limited differentiation between the output shafts 16 and 32 in conjunction with the one-way clutches as will be described. The second drive sprocket assembly may include a third drive sprocket 170, a fourth drive sprocket 174 and a chain 172 coupled between a gear member of the interaxle differential and the output shaft 16. The second drive sprocket assembly compensates for normal differentiation, allowing sleeve member 156 to overrun the second or rear torque output shaft 32 by an amount equal to the amount of overrunning which may occur during maximum steering angle "normal" turning or cornering operations for a particular motor vehicle. Third drive sprocket 170, which is coupled to rotate with first of front output shaft 16 via drive chain 172 and fourth drive sprocket 174, also senses the rotational speed of second or rear torque output shaft 32. During "normal" turning or cornering operations on dry pavement at the maximum steering angle for a particular motor vehicle, first drive sprocket 138 will overrun second or rear torque output shaft 32, but third drive sprocket 170 will not. However, when front wheels 30 begin to slip to an extent greater than occurs during "normal" turning or cornering for a particular motor vehicle, as may occur when front wheels 30 encounter ice, snow, mud or the like, third drive sprocket 170 will attempt to overrun second or rear torque output shaft 32. A second overrunning or one-way clutch 178 is provided to selectively couple third drive sprocket 170 and second or rear torque output shaft 32 when third sprocket 170 attempts to overrun second or rear torque output shaft 32, thereby preventing any further differentiation between output shafts 16 and 32. As in the case with first overrunning or one-way clutch 168, second overrunning or one-way clutch 178 is preferably a double-acting one-way clutch which will allow second or rear torque output shaft 32 to overrun third output sprocket 170 as it will at any time when front wheels 30 are not slipping excessively.

First overrunning or one-way clutch 168 and second overrunning or one-way clutch 178 may be any suitable one-way clutch, such as, for example, ratchet, sprag, multi-disk or one-way ball and ramp clutches, which allows the driven member to overrun the driving member, but which does not allow the driving member to overrun the driven member, thereby drivingly coupling the driving member to the driven member. A sensing mechanism may be used to determine the direction of relative rotation between the shafts 16 and 32. As an example of a suitable arrangement, a sensing device 169 may be used to determine the direction of rotation of the input shaft 112 relative to the housing 122 of the transfer case to give an indication of whether the vehicle is in forward or reverse. Upon determining the relative rotation between output shafts 16 and 32, an actuating device may be used to reverse the direction of the bi-directional, one-way clutches 168 and 178 when required. As an example, a cam or triggering device 179 may be used to reverse the clutch operation, or alternatively could be electronically or electromagnetically reversed for proper operation via a vehicle control system.

Figure 3:
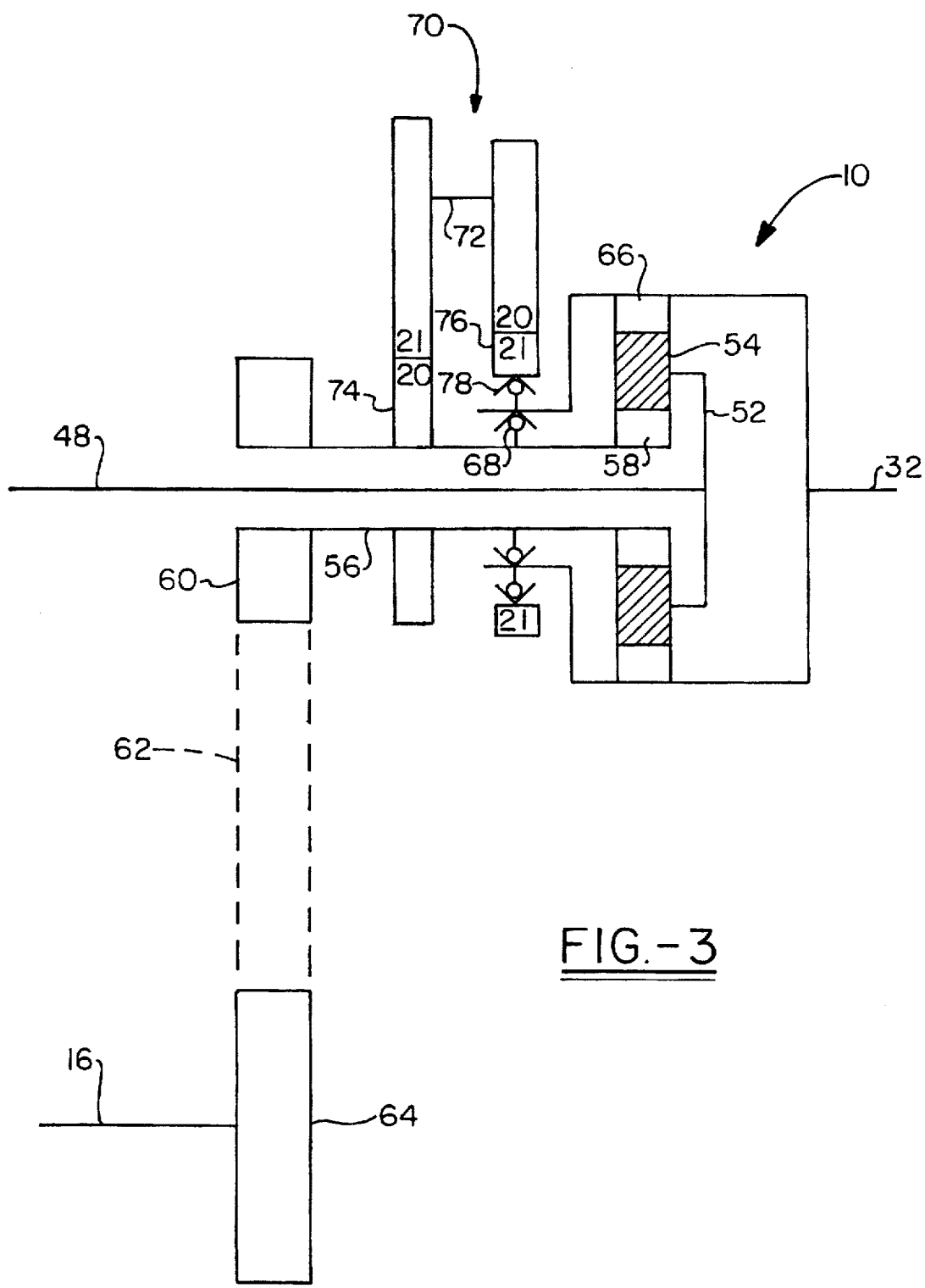
FIG. 3 illustrates a schematic view of the internal components of the torque transfer case shown in FIG. 1 in accordance with a further embodiment of the present invention.

Referring now to FIG. 3, another embodiment of the invention is shown, represented by a schematic view of the internal components of torque transfer case 10. Torque input shaft 48 is coupled to a torque output shaft (not shown) of motor vehicle transmission 12 (seen in FIG. 1) to receive torque therefrom. Torque transfer case 10 preferably utilizes an interaxle planetary gear differential, generally indicated by reference numeral 50, to divide torque between first or front torque output shaft 16 and second or rear torque output shaft 32 of transfer case 10. Torque input shaft 48 is secured to planet gear carrier 52, which carries a plurality of circumferentially spaced and individually rotatable planet gears 54. Sleeve member 56 is rotatably mounted about torque input shaft 48 and carries at one end sun gear 58 of interaxle planetary gear differential 50. Sun gear 58 is meshingly engaged with planet gears 54. Sleeve member 56 also carries first drive sprocket 60, which is coupled to rotate with sleeve member 56 for transferring torque from sleeve member 56, through drive belt or chain 62, to first or front torque output shaft 16, and through second drive sprocket 64, which is coupled to rotate with first or front torque output shaft 16. Other suitable means, for example a plurality of gears or a belt drive, may be utilized if desired to transfer torque to first or front torque output shaft 16, and it is not intended to limit the invention to the particular sprocket and chain arrangement shown. Interaxle planetary gear differential 50 further includes ring gear 66, which is meshingly engaged with planet gears 54 and coupled to rotate with second or rear torque output shaft 32. Interaxle planetary gear differential 50 serves to divide torque received from torque input shaft 48 between sun gear 58 and ring gear 66.

Torque transmitted to sun gear 58 through planet gears 54 is transmitted through sleeve member 56 to first drive sprocket 60 and, consequently, to front wheels 30 of the motor vehicle through motor vehicle front axle drive shaft. Because ring gear 66 is secured to second or rear torque output shaft 36, torque transmitted to ring gear 66 through planet gears 54 is transmitted to rear wheels 46 of the motor vehicle through motor vehicle rear axle drive shaft 36.

As described previously, when front wheels 30 and rear wheels 46 are presented with similar traction conditions, for example when the motor vehicle is traveling on dry pavement, interaxle planetary gear differential 50 serves to divide the torque received from torque input shaft such that neither sun gear 58 or ring gear 66 receives a disproportionate amount of torque. Consequently, both front wheels 30 and rear wheels 46 serve to propel the motor vehicle. However, when front wheels 30 and rear wheels 46 encounter significantly differing coefficient of friction surfaces, the nature of interaxle planetary gear differential 50 is such that the wheels encountering the low coefficient surface may exceed the tractive capability of that surface and begin to spin. The remaining wheels then will receive torque at the same level as the spinning wheel or wheels, properly modified by the ratios in the affected differentials. If the coefficient of friction under the non-slipping wheel or wheels is greater, then additional traction can be obtained by restricting differentiation and thereby directing more torque to the wheels with a greater tractive capability. When first or front torque output shaft 16 and sleeve member 56 rotate significantly faster than second or rear torque output shaft 32 and ring gear 66, respectively, or, on the other hand, when rear output shaft 32 and ring gear 66 rotate significantly faster than the front output shaft 16 and sleeve member 56, respectively, the faster rotating components are said to be "overrunning" the slower rotating components.

First overrunning or one-way clutch 68 is provided for drivingly coupling ring gear 66 and sleeve member 56, on a selective basis, which effectively locks interaxle planetary gear differential 50 to allow ring gear 66 to transmit torque to sleeve member 56 when ring gear 66 attempts to overrun sleeve member 56. Accordingly, additional torque is transmitted to front wheels 30, which may have better traction with which to provide propelling force for the motor vehicle. As previously discussed, ring gear 66 will attempt to overrun sleeve member 56 when rear wheels 46 slip and begin to spin significantly more rapidly than front wheels 30, as might occur when one or both rear wheels 46 encounter ice, snow, mud or the like. First overrunning or one-way clutch 68 is preferably one-way, as will be described below, to allow sleeve member 56 to overrun ring gear 66, as may occur during "normal" motor vehicle operations, such as during cornering or turning, when front wheels 30 of the motor vehicle spin faster than rear wheels 46. Therefore, first overrunning or one-way clutch 68 may only transmit torque from ring gear 66 to sleeve member 56 and not from sleeve member 56 to ring gear 66.

The system of the invention again allows differentiation up to a predetermined degree to accommodate "normal" motor vehicle operating conditions, such as differentiation required for cornering or turning with high or relatively high traction. However, excessive differentiation or overrunning of front wheels 30 relative to rear wheels 46 beyond this maximum level of differentiation encountered at the maximum steering angle is indicative of a low traction condition being encountered by front wheels 30. It is therefore desirable to provide means for allowing interaxle differential 50 to differentiate up to the maximum expected amount of differentiation which needs to occur at the maximum steering angle for a particular motor vehicle, and to, thereafter, "lock" interaxle planetary gear differential 50 to prevent any differentiation beyond this maximum expected amount. This embodiment also provides the four-wheel motor vehicle drive transfer case with limited differentiation using mechanical means for allowing at least as much differentiation as may be required at the maximum steering angle for a particular motor vehicle, and, thereafter, preventing further differentiation.

Reduction gear assembly 70 secured to countershaft 72 is provided to "absorb" or compensate for an amount of overrunning of sleeve member 56 relative to ring gear 66 equal to the amount of overrunning which may occur during maximum steering angle "normal" turning or cornering operations for a particular motor vehicle. Gear 74 which is coupled to rotate with sleeve member 56, transmits torque from sleeve member 56 through one or more additional gears of reduction gear assembly 70 to output gear 76, which will rotate at a slower speed than sleeve member 56. Specifically, output gear 76 will rotate at a speed equal to the speed of rotation of sleeve member 56, minus the amount of speed "absorbed" by reduction gear assembly 70, to compensate for overrunning which may occur during "normal" turning or cornering operations for a particular motor vehicle. Therefore, during "normal" turning or cornering operations on dry pavement at the maximum steering angle for a particular motor vehicle, sleeve member 56 will overrun ring gear 66, but output gear 76 will not overrun ring gear 66. However, when front wheels 30 begin to slip to an extent greater than occurs during "normal" turning or cornering for a particular motor vehicle, as may occur when front wheels 30 encounter ice, snow, mud or the like, output gear 76 will attempt to overrun ring gear 66. Second overrunning or one-way clutch 78 is provided to selectively couple output gear 76 and ring gear 66 when output gear 76 attempts to overrun ring gear 66. As is the case with first overrunning or one-way clutch 68, second overrunning or one-way clutch 78 is preferably a one-way clutch which will allow ring gear 66 to overrun output gear 76 as it will at any time when front wheels 30 are not slipping excessively.

First overrunning or one-way clutch 68 and second overrunning or one-way clutch 78 may be any suitable one-way clutch such as, for example, one-way ball and ramp clutches that allow the driven member to overrun the driving member, but which do not allow the driving member to overrun the driven member, thereby drivingly coupling the driving member to the driven member. As previously described, the relative rotation of the front and rear output shafts 16 and 32 will depend upon the direction of travel of the vehicle. To accommodate both forward and reverse travel of the vehicle, the one-way clutches 68 and 78 again are desirably bi-directional, wherein the direction of overrun and of clutch engagement must be changed as the direction of vehicle travel is changed from forward to reverse or vice versa. Similar mechanisms to allow the bi-directional, one-way clutches to be properly set for functioning according to the vehicle direction of travel may be used as previously described.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A four-wheel drive system for a vehicle having an engine and a transmission and including a torque transfer case for dividing torque for front and rear axles of the vehicle, said torque transfer case comprising:

an input shaft coupled to the transmission to be rotatably driven thereby;

a first output shaft to transmit torque to a first axle of the vehicle;

a second output shaft to transmit torque to second axle of the vehicle;

an interaxle differential disposed between said input shaft and said first and second output shafts for transmitting torque from said input shaft to said first and second output shafts, and allowing said first and second output shafts to rotate differentially with respect to one another;

a first one-way clutch to selectively lock said interaxle differential such that said first and second output shafts are rotatably coupled to one another when said second output shaft overruns said first output shaft; and a second one-way clutch to selectively lock said interaxle differential such that said first and second output shafts are rotatably coupled to one another when said first output shaft overruns said second output shaft by a predetermined amount.

2. The four-wheel drive system in accordance with claim 1, wherein, said interaxle differential of said transfer case is a planetary gear differential including a planet gear carrier coupled for rotation with said input shaft, said planet gear carrier supporting a plurality of circumferentially spaced and individually rotatable planet gears;

a sun gear coupled for rotation with a sleeve member, wherein said sleeve member is rotatably mounted about said input shaft, said sleeve member including a drive sprocket coupled for rotation with said sleeve member and connected to transfer torque to said first output shaft; and a ring gear coupled for rotation with said second output shaft to transfer torque thereto.

3. The four-wheel drive system in accordance with claim 2, wherein said first one-way clutch selectively drivingly couples said ring gear and said sleeve member to allow said ring gear to transmit torque to said sleeve member when said ring gear overruns said sleeve member.

4. The transfer case in accordance with claim 2, wherein said first one-way clutch selectively drivingly couples said second output shaft and said sleeve member to allow said second output shaft to transmit torque to said sleeve member when said second output shaft overruns said sleeve member.

5. The transfer case in accordance with claim 4, further comprising a second drive sprocket coupled to rotate with said first output shaft and a third drive sprocket surrounding said sleeve member and coupled to rotate with said second drive sprocket, wherein said second drive sprocket receives torque from said first output shaft at a first rotational speed and transmits said torque received to said second drive sprocket at a second rotational speed slower than said first rotational speed to thereby compensate for a predetermined amount of differentiation of said first output shaft relative to said second output shaft such that said second one-way clutch drivingly couples said third drive sprocket to said second output shaft when said third drive sprocket overruns said second output shaft.

6. The torque transfer case in accordance with claim 5, wherein said third drive sprocket is designed to compensate for a predetermined amount of differentiation of said first output shaft relative to said second output shaft equal to that amount by which said first output shaft will overrun said second output shaft at maximum vehicle steering angle.

7. The four-wheel drive system in accordance with claim 1, further comprising a first drive sprocket assembly associated with and driven by a gear member of said interaxle differential to transfer torque from said input shaft to said first output shaft, and a second drive sprocket assembly coupled for rotation with said first output shaft, wherein said second one-way clutch locks said second drive sprocket assembly for rotation with said second output shaft when said second drive sprocket assembly overruns said second output shaft.

8. The four-wheel drive system in accordance with claim 7, wherein said second drive sprocket assembly has a gear ratio relative to said first drive sprocket assembly to compensate for a predetermined amount of differentiation of said first output shaft relative to said second output shaft.

9. The four-wheel drive system in accordance with claim 1, further comprising a reduction gear assembly mounted on a countershaft to receive torque from said interaxle differential at a first rotational speed and for transmitting said torque received at a second rotational speed slower than said first rotational speed to an output gear to thereby compensate for a predetermined amount of differentiation of said first output shaft relative to said second output shaft such that said second one-way clutch drivingly couples said output gear of said reduction gear assembly to a gear member of said interaxle differential when said output gear overruns said gear member.

10. The four-wheel drive system in accordance with claim 9, wherein said reduction gear set is designed to compensate for a predetermined amount of differentiation of said first output shaft relative to said second output shaft equal to that amount by which said first output shaft will overrun said second output shaft at maximum vehicle steering angle.

11. A transfer case for dividing torque to front and rear axles of a vehicle, said transfer case comprising:

an input shaft coupled to a vehicle transmission to be rotatably driven thereby;

a first output shaft to transmit torque to a first axle of the vehicle;

a second output shaft to transmit torque to a second axle of the vehicle;

an interaxle differential disposed between said input shaft and said first and second output shafts for transmitting torque from said input shaft to said first and second output shafts, and allowing said first and second output shafts to rotate differentially with respect to one another;

a first one-way clutch to selectively lock said interaxle differential when said second output shaft overruns said first output shaft by a predetermined amount; and a second one-way clutch to selectively lock said interaxle differential when said first output shaft overruns said second output shaft by a predetermined amount.

12. The torque transfer case in accordance with claim 11, wherein said interaxle differential of said transfer case is a planetary gear differential including:

a planet gear carrier coupled for rotation with said input shaft, said planet gear carrier supporting a plurality of circumferentially spaced and individually rotatable planet gears;

a sun gear coupled for rotation with a sleeve member, wherein said sleeve member is rotatably mounted about said input shaft, said sleeve member including a drive sprocket coupled for rotation with said sleeve member and connected to transfer torque to said first output shaft; and a ring gear coupled for rotation with said second output shaft to transfer torque thereto.

13. The torque transfer case in accordance with claim 12, wherein said first one-way clutch selectively drivingly couples said ring gear and said sleeve member to allow said ring gear to transmit torque to said sleeve member when said ring gear overruns said sleeve member.

14. The torque transfer case in accordance with claim 13, further comprising a reduction gear assembly mounted on a countershaft to receive torque from said sleeve member at a first rotational speed and for transmitting said torque received at a second rotational speed slower than said first rotational speed to an output gear to thereby compensate for a predetermined amount of differentiation of said first output shaft relative to said second output shaft such that said second one-way clutch drivingly couples said output gear of said reduction gear assembly to said ring gear when said output gear overruns said ring gear.

15. The transfer case in accordance with claim 14, wherein said reduction gear set is designed to compensate for a predetermined amount of differentiation of said first output shaft relative to said second output shaft equal to that amount by which said first output shaft will overrun said second output shaft at maximum vehicle steering angle.

16. The transfer case in accordance with claim 11, wherein said first and second one-way clutches are bi-directional so as to selectively lock said interaxle differential upon relative rotation of said first and second output shafts being reversed.

17. A transfer case for dividing torque to front and rear axles of a vehicle, said transfer case comprising:

a transfer case housing;

an input shaft rotationally supported in said housing and coupled to a vehicle transmission to be rotatably driven thereby;

a front output shaft to transmit torque to a front axle of the vehicle;

a rear output shaft to transmit torque to a rear axle of the vehicle;

an interaxle differential disposed between said input shaft and said front and rear output shafts for transmitting torque from said input shaft to said front and rear output shafts, and allowing said first and second output shafts to rotate differentially with respect to one another;

at least a first bi-directional one-way clutch disposed between said rear output shaft and said front output shaft to selectively lock said interaxle differential when said rear output shaft tends to overrun said front output shaft to restrict such overunning by engagement of said at least first clutch.

18. The transfer case in accordance with claim 17, wherein said at least first bidirectional clutch is actuated according to the direction of travel of said vehicle, to allow said front output shaft to overrun said rear output shaft, but to restrict said rear output shaft from overrunning said front output shaft and to transfer torque from said rear output shaft to said front output shaft if said rear output shaft tends to overrun said front output shaft when the vehicle is moving in the forward direction.

19. The transfer case in accordance with claim 17, wherein said at least first bidirectional clutch is actuated according to the direction of travel of said vehicle, to allow said front output shaft to overrun said rear output shaft, but to restrict said rear output shaft from overrunning said front output shaft and to transfer torque from said rear output shaft to said front output shaft if said rear output shaft tends to overrun said front output shaft when the vehicle is moving in the rearward direction.

20. The torque transfer case in accordance with claim 17, wherein,
said direction of travel of said vehicle is sensed by determining the relative rotation between said front and rear output shafts, and said at least first bidirectional one-way clutch is actuated based upon said determination.

21. The torque transfer case in accordance with claim 17, wherein,
said direction of travel of said vehicle is determined by sensing the relative rotation between said input shaft and said housing of said transfer case.

22. A transfer case for dividing torque to front and rear axles of a vehicle, said transfer case comprising:

a housing;

an input shaft supported in said housing and coupled to a vehicle transmission to be rotatably driven thereby;

a front output shaft to transmit torque to a front axle of the vehicle;

a rear output shaft to transmit torque to a rear axle of the vehicle;

an interaxle differential disposed between said input shaft and said front and rear output shafts for transmitting torque from said input shaft to said front and rear output shafts, and allowing said first and second output shafts to rotate differentially with respect to one another;

at least a first bi-directional one-way clutch disposed between said rear output shaft and said front output shaft to selectively lock said interaxle differential when said rear output shaft tends to overrun said front output shall to restrict such overunning by engagement of said at least first clutch.

23. The transfer case in accordance with claim 22, wherein said at least first bidirectional clutch is actuated according to the direction of travel of said vehicle, to allow said rear output shaft to overrun said front output shaft, but to restrict said front output shaft from overrunning said rear output shaft and to transfer torque from said front output shaft to said rear output shaft if said front output shaft tends to overrun said rear output shaft when the vehicle is moving in the forward direction.

24. The transfer case in accordance with claim 22, wherein said at least first bidirectional clutch is actuated according to the direction of travel of said vehicle, to allow said rear output shaft to overrun said front output shaft, but to restrict said front output shaft from overrunning said rear output shaft and to transfer torque from said front output shaft to said rear output shaft if said front output shaft tends to overrun said rear output shaft when the vehicle is moving in the rearward direction.

25. The torque transfer case in accordance with claim 22, wherein,
said direction of travel of said vehicle is sensed by determining the relative rotation between said front and rear output shafts, and said at least first bidirectional one-way clutch is actuated based upon said determination.

26. The torque transfer case in accordance with claim 22, wherein,
said direction of travel of said vehicle is determined by sensing the relative rotation between said input shaft and said housing of said transfer case.

27. The torque transfer case in accordance with claims 17 or 22, wherein,

The direction of overrun allowed by said at least first bidirectional one-way clutch and the transfer of torque between said front and rear output shafts is set by sensing the relative rotation of a front output member and a mechanism which allows a predetermined amount of overrun between said front and rear output shafts, being related to the direction of travel of said vehicle.

* * * * *